US010236774B2

(12) United States Patent
Gritti (10) Patent No.: US 10,236,774 B2
(45) Date of Patent: Mar. 19, 2019

(54) CONTROL MODULE FOR A CONSTANT-FREQUENCY SWITCHING CONVERTER AND METHOD FOR CONTROLLING A SWITCHING CONVERTER

(71) Applicant: STMICROELECTRONICS S.R.L., Agrate Brianza (IT)

(72) Inventor: Giovanni Gritti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/027,004

(22) Filed: Jul. 3, 2018

(65) Prior Publication Data
US 2019/0013731 A1    Jan. 10, 2019

(30) Foreign Application Priority Data
Jul. 5, 2017    (IT) .................................. 10201773773

(51) Int. Cl.
*H02M 3/157*    (2006.01)
*H02M 3/335*    (2006.01)
(Continued)

(52) U.S. Cl.
CPC ............. *H02M 3/157* (2013.01); *H02J 7/008* (2013.01); *H02M 3/156* (2013.01); *H02M 3/1582* (2013.01); *H02M 3/1584* (2013.01); *H02M 3/33515* (2013.01)

(58) Field of Classification Search
CPC ............. H02M 3/1582; H02M 1/4225; H02M 2001/4291; H02M 2003/1552; H02M 3/3353; H02M 3/156; H02M 3/157
See application file for complete search history.

(56) References Cited

U.S. PATENT DOCUMENTS 7,042,743 B2    5/2006 Pidutti et al.
8,270,190 B2    9/2012 Adragna
(Continued)

OTHER PUBLICATIONS

Adragna et al., "New Fixed Off-Time PWM Modulator Provides Constant Frequency Operation in Boost PFC Pre-regulators," *International Symposium on Power Electronics, Electrical Drives, Automation and Motion*, Ischia, Italy, Jun. 11-13, 2008, pp. 656-661.
(Continued)

Primary Examiner — Gary L Laxton
Assistant Examiner — Demetries A Gibson
(74) *Attorney, Agent, or Firm* — Seed IP Law Group LLP (57) ABSTRACT

A control module controls a switching converter including at least one inductor element and one switching element. The module includes: a driver circuit that generates a control signal which controls the on and off cycles of the switching element; a first modulation circuit which sends a command to the driver circuit in such a manner as to generate edges of a first type of the control signal, as a function of the input electrical quantity and of a reference electrical quantity; and a second modulation circuit which sends a command to the driver circuit in such a manner as to generate edges of a second type of the control signal, as a function of a first and a second internal electrical quantity, which are functions respectively of the charges on a first and a second capacitor, which are charged and discharged as a function of the control signal.

21 Claims, 5 Drawing Sheets

(51) Int. Cl.
*H02J 7/00* (2006.01)
*H02M 3/158* (2006.01)
*H02M 3/156* (2006.01)

(56) References Cited

U.S. PATENT DOCUMENTS

| | | | | |
|---|---|---|---|---|
| 2008/0007238 A1* | 1/2008 | Ohtake | ............... | H02M 3/158 323/284 |
| 2011/0102950 A1* | 5/2011 | Park | ............... | H02M 1/4225 361/18 |
| 2014/0097808 A1* | 4/2014 | Clark | ............... | G05F 1/70 323/208 |
| 2015/0109835 A1* | 4/2015 | Xu | ............... | H02H 3/202 363/50 |
| 2016/0065054 A1* | 3/2016 | Li | ............... | H02M 1/4225 363/89 |
| 2017/0019030 A1 | 1/2017 | Sugawara | | |
| 2017/0063227 A1* | 3/2017 | Nakamura | ............ | H02M 3/158 |

OTHER PUBLICATIONS

Adragna, "Fixed-Off-Time Control of PFC Pre-regulators," *10th European Conference on Power Electronics and Applications*, Toulouse, France, Sep. 2-4, 2003, 10 pages.

Chen et al., "Pseudo-Constant Switching Frequency in On-Time Controlled Buck Converter with Predicting Correction Techniques," *IEEE Transactions on Power Electronics* 31(5):3650-3662, 2016.

Lee et al., "A 14V-Output Adaptive-Off-Time Boost Converter with Quasi-Fixed-Frequency in Full Loading Range," *IEEE International Symposium of Circuits and Systems*, Rio de Janeiro, Brazil, May 15-18, 2011, pp. 233-236.

Lin et al., "A Current Mode Adaptive On-Time Control Scheme for Fast Transient DC-DC Converters," *IEEE International Symposium on Circuits and Systems*, Seattle, Washington, USA, May 18-21, 2008, pp. 2602-2605.

Ridley, "A New Continuous-Time Model for Current-Mode Control with Constant Frequency, Constant On-Time, and Constant Off-Time, in CCM and DCM," *21st Annual IEEE Conference on Power Electronics Specialists*, San Antonio, Texas, USA, 1990, pp. 382-389.

Shi et al., "Frequency compensation circuit for adaptive on-time control buck regulator," *IET Power Electronics* 7(7):1805-1809, 2014.

STMicroelectronics, "400 W FOT-controlled PFC pre-regulator with the L6563," AN2485: Application note, Mar. 2007, 29 pages.

Xu et al., "A Quasi Fixed Frequency Constant on Time Controlled Boost Converter," *IEEE International Symposium on Circuits and Systems*, Seattle, Washington, USA, May 18-21, 2008, pp. 2206-2209.

* cited by examiner

CONTROL MODULE FOR A CONSTANT-FREQUENCY SWITCHING CONVERTER AND METHOD FOR CONTROLLING A SWITCHING CONVERTER

BACKGROUND

Technical Field

The present disclosure relates to a control module for a switching converter, which has a constant switching frequency. Furthermore, the present disclosure refers to a method for controlling a switching converter.

Description of the Related Art

As is known, there exist various types of switching converters, amongst which "flyback", "boost" and "buck" converters may, for example, be mentioned.

Switching converters are for example employed for correcting the power factor (PF), namely circuits designed to increase the power factor, which, as is known, is indicative of the ratio between the real power and the apparent power at the input to a load.

Referring, by way of example, to a switching converter of the boost type, it is known that this typically includes at least one inductor, whose charging and discharging phases are controlled in a cyclical manner via a MOSFET transistor coupled to it, in such a manner as to allow the converter to generate on its output a voltage higher than the voltage present on its input. That being said, the switching converter is defined as operating, respectively, i) in continuous conduction mode (CCM), ii) in transition mode (TM), or else iii) in discontinuous conduction mode (DCM), depending on the fact that, within each cycle, the current flowing in the inductor is alternately i) always non-zero, ii) zero for a very limited (ideally, zero) period of time or else iii) zero for an appreciable period of time.

Again with reference, by way of example, to boost converters, the converters operating in CCM are furthermore separated into:
 converters with fixed-frequency pulse width modulation control (FF PWM control), if the cycles have a fixed duration and the turn-on time of the MOSFET transistor within each cycle can vary from cycle to cycle; and
 converters with fixed off-time control (FOT), if, within each cycle, the MOSFET transistor remains off for a constant time, whereas the duration of the turn-on, and thus of the cycle, is variable.

Referring to the CCM converters with fixed off-time control, these operate in peak-current mode, where the switching of the MOSFET transistor (in particular, when it turns off) is determined by comparing an electrical quantity internal to the converter with an electrical quantity proportional to the current flowing in the inductor.

This being said, the CCM converters with fixed off-time control are characterized by relatively simple circuit solutions, which are intrinsically stable and thus do not require the implementation of techniques referred to as "slope compensation", in the case of a duty cycle greater than 50%.

Unfortunately, the CCM converters with fixed off-time control are also characterized by a few disadvantages, which include, amongst others, a total harmonic distortion (THD) of the input current that is relatively high and a high variability of the switching frequency. In particular, as far as the high variability of the switching frequency is concerned, this is undesirable since it includes the fact that, over certain periods of time, the switching frequency takes particularly high values, and thus the converter operates in a region of low efficiency. Furthermore, in the case in which the switching converter forms a more complex system of regulation, which includes a plurality of converters, the need to have signals with a high spectral purity is fairly common, given that this characteristic allows potential filters that need to be interposed between the converters to be optimized.

In order to reduce the variability of the switching frequency, U.S. Pat. No. 8,270,190 describes a switching converter of the boost type, in which the turn-off time of the transistor (also known as $T_{off}$) is modulated as a function of the input voltage. This solution has been demonstrated to be satisfactory in the case in which the switching converter operates in CCM mode; in contrast, in the case in which the switching converter operates in DCM mode, for example because of a reduction in the load with respect to the conditions referred to as full-load, or else in proximity to the operating points known as zero-crossing points of the input voltage, the switching frequency exhibits pronounced variations (for example, even as high as around 50/60%).

BRIEF SUMMARY

At least one embodiment of the present disclosure is a switching converter which overcomes, at least in part, the drawbacks of the prior art.

According to at least one embodiment of the present disclosure, a control module controls a switching converter configured to generate an output electrical quantity from an input electrical quantity and including an inductor element and one switching element, which is operable in such a manner as to vary a current flowing in the inductor element. The control module includes:
 a driver circuit configured to generate a control signal designed to control on and off cycles of the switching element;
 a first modulation circuit configured to generate first edges of a first type of a control signal as a function of the input electrical quantity and of a reference electrical quantity, and configured to control the driver circuit with the first edges of the control signal; and
 a second modulation circuit configured to generate second edges of a second type of the control signal and configured to control the driver circuit with the second edges of the control signal.

The second modulation circuit includes:
 a first sub-circuit including a first capacitor and a first charge circuit configured to control, during each on and off cycle, charging and discharging of the first capacitor as a function of the control signal, and generate a first internal electrical quantity, which is a function of a charge on the first capacitor;
 a second sub-circuit including a second capacitor and a second charge circuit configured to control, during each on and off cycle, charging and discharging of the second capacitor as a function of the control signal, generate a second internal electrical quantity, which is a function of a charge on the second capacitor; and
 a decision circuit configured to control the driver circuit in such a manner as to cause generation of the edges of the second type of the control signal when the first and second internal electrical quantities satisfy a relationship.

The first charge circuit is configured to generate, within each on and off cycle, the first internal electrical quantity to be directly proportional to a duration of a time interval included between the corresponding first edge of the control signal and the second edge of the control signal in the on and off cycle. The second charge circuit is configured to generate the second internal electrical quantity as a function of a ratio between said time interval and a switching period.

BRIEF DESCRIPTION OF THE SEVERAL VIEWS OF THE DRAWINGS

For a better understanding of the present disclosure, some of its preferred embodiments are now described, purely by way of non-limiting example and with reference to the appended drawings, in which.

DETAILED DESCRIPTION

Figure 1:
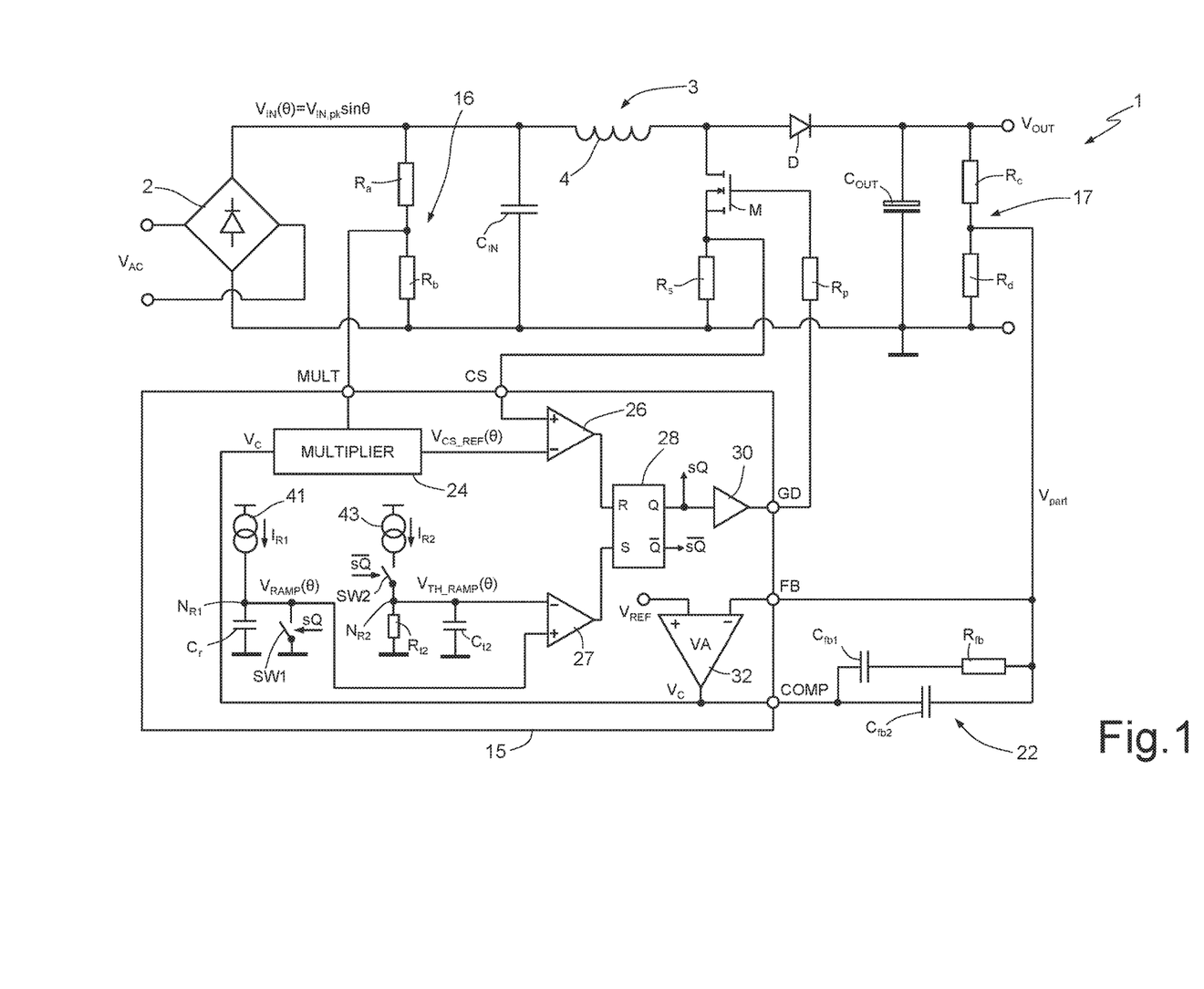
FIG. 1 shows a circuit diagram of a power supply including a switching converter.

FIG. 1 shows a switching power supply 1 of the boost type, which is referred to hereinafter as boost power supply 1.

In more detail, the boost power supply 1 includes a bridge rectifier 2, which has two input terminals, designed to receive an alternating voltage $V_{AC}$ from a supply line, and a first and a second output terminal, respectively connected to ground and to a first terminal of a filtering capacitor $C_{in}$, whose second terminal is connected to ground. The bridge rectifier 2 supplies, on its second output terminal, a voltage $V_{IN}(\theta)$ which is referred to hereinafter as input voltage $V_{IN}(\theta)$; $\theta$ is the phase of the alternating voltage $V_{AC}$ present on the power supply line, therefore the relationship $V_{IN}(\theta) = V_{IN,pk}*\sin\theta$ is valid, in which $V_{IN,pk}$ indicates the peak voltage of the input voltage $V_{IN}(\theta)$ and $0 \leq \theta \leq \pi$.

The boost power supply 1 furthermore comprises a boost converter 3, which includes, aside from the filtering capacitor $C_{in}$, an inductor 4, a control module 15, a first resistive voltage divider 16, which includes a first and a second resistor $R_a$, $R_b$, and a transistor M formed for example by an enhancement type N-channel MOSFET transistor.

The boost converter 3 furthermore comprises a feedback circuit 22, a diode D, which is referred to hereinafter as output diode D, a further capacitor $C_{out}$ (for example, of the electrolytic type), which is referred to hereinafter as output capacitor $C_{out}$, and a second resistive voltage divider 17, which includes a third and a fourth resistor $R_c$, $R_d$. In addition, the boost converter 3 comprises a fifth and a sixth resistor $R_s$, $R_p$, which are hereinafter respectively referred to as sense resistor $R_s$ and control resistor $R_p$.

The first resistor $R_a$ has a first and a second terminal, which are respectively connected to the first terminal of the filtering capacitor $C_{in}$ and to a first terminal of the second resistor $R_b$, whose second terminal is connected to ground.

In practice, the second terminal of the first resistor $R_a$ and the first terminal of the second resistor $R_b$ form a node electrically coincident with a first input terminal MULT of the control module 15. Accordingly, as described in more detail in the following, the control module 15 furthermore comprises a second, a third and a fourth input terminal, respectively indicated with CS, FB and COMP, together with an output terminal, indicated with GD.

The inductor 4 has a respective first terminal, which is connected to the first terminal of the filtering capacitor $C_{in}$, and hence to the first terminal of the first resistor $R_a$ and to the second output terminal of the bridge rectifier 2. The inductor 4 has furthermore a respective second terminal, which is connected to the anode of the output diode D, whose cathode is connected to a first terminal of the output capacitor $C_{out}$, whose second terminal is connected to ground.

The second terminal of the inductor 4 is furthermore connected to the drain terminal of the transistor M, whose source terminal is connected to a first terminal of the sense resistor $R_s$, whose second terminal is connected to ground. The gate terminal of the transistor M is connected to a first terminal of the control resistor $R_p$, whose second terminal is connected to the output terminal GD of the control module 15.

The first and the second terminal of the third resistor $R_c$ are connected, respectively, to the first terminal of the output capacitor $C_{out}$ and to the third input terminal FB of the control module 15. The first and the second terminal of the fourth resistor $R_d$ are connected, respectively, to the third input terminal FB of the control module 15 and to ground.

The feedback circuit 22 is connected between the third and the fourth input terminal FB, COMP of the control module 15. In particular, the feedback circuit 22 comprises a seventh resistor $R_{fb}$, which is referred to hereinafter as feedback resistor $R_{fb}$, and to a further pair of capacitors $C_{fb1}$, $C_{fb2}$, which are respectively referred to hereinafter as first and second feedback capacitor $C_{fb1}$, $C_{fb2}$.

In detail, the first and the second terminal of the feedback resistor $R_{fb}$ are connected, respectively, to the third input terminal FB of the control module 15 and to the first terminal of the first feedback capacitor $C_{fb1}$, whose second terminal is connected to the fourth input terminal COMP of the control module 15. The first and the second terminal of the second feedback capacitor $C_{fb2}$ are connected, respectively, to the third and to the fourth input terminal FB, COMP of the control module 15.

In operation, the voltage across the output capacitor $C_{out}$, which is referred to hereinafter as output voltage $V_{out}$, represents the voltage to be regulated by the boost converter 3. Although not shown, the output voltage $V_{out}$ is applied to a load.

The control module 15 furthermore comprises a multiplier 24, a first and a second comparator 26, 27, a flip-flop 28 of the set-reset type, a driver circuit 30 and an error amplifier circuit 32, which is referred to hereinafter as error amplifier 32.

In detail, the error amplifier 32 has a first input, which forms the third input terminal FB of the control module 15, and a second input, which is connected to a reference node, to which a reference voltage $V_{REF}$ is applied. The error amplifier 32 has another output, which forms the fourth input terminal COMP of the control module 15.

The multiplier 24 has a first input, which forms the first input terminal MULT of the control module 15 and is thus connected to the first resistive voltage divider 16, and a second input, which is connected to the output of the error amplifier 32. The output of the multiplier 24 is connected to a negative input terminal of the first comparator 26, which furthermore has a positive input terminal that forms the second input terminal CS of the control module 15 and is thus connected to the sense resistor $R_s$. The output of the first comparator 26 is connected to the reset input (indicated with R) of the flip-flop 28.

The second comparator 27 receives a voltage $V_{TH\_RAMP}(\theta)$ and a voltage $V_{RAMP}(\theta)$ (described in more detail in the following), respectively on its own negative input terminal and on its own positive input terminal. Furthermore, the second comparator 27 has a respective output, which is connected to the set input (indicated with S) of the flip-flop 28. In turn, the flip-flop 28 furthermore has a first and a second output (respectively indicated with Q and $\overline{Q}$), on which the signals sQ and $\overline{sQ}$ are respectively present, one of which is the logical negation of the other. The first output of the flip-flop 28 is connected to an input of the driver circuit 30, whose output forms the output terminal GD of the control module 15.

In use, the error amplifier 32 generates a control voltage $V_c$ on its own output, which depends on the difference between the reference voltage $V_{REF}$ and the partition of the output voltage $V_{out}$ provided by the second resistive voltage divider 17, the latter voltage being present on the third input terminal FB of the control module 15 and being indicated as the voltage $V_{part}$. In practice, the control voltage $V_c$ depends on the difference between the partition voltage $V_{part}$ and the reference voltage $V_{REF}$, in such a manner as to regulate the output voltage $V_{out}$. To a first approximation, the control voltage $V_c$ may be considered as constant, since the bandwidth of the control loop is much lower than the frequency of the input voltage $V_{IN}(\theta)$.

In more detail, the error amplifier 32 has a DC gain so as to be able to assume that the error present on its own inputs, and thus the aforementioned difference between the voltage $V_{part}$ and the reference voltage $V_{REF}$, is zero. For non-zero frequencies, the gain of the error amplifier 32 depends on the feedback circuit 22, which allows the stability of the converter to be maintained.

The multiplier 24 thus receives on its own second input the control voltage $V_c$. Furthermore, on its own first input, the multiplier 24 receives a voltage which is directly proportional to the input voltage $V_{IN}(\theta)$, through the partition ratio $R_2/(R_1+R_2)$ introduced by the first resistive voltage divider 16, in which $R_1$ and $R_2$ indicate the resistance values of the first and of the second resistor $R_a$, $R_b$.

At its output, the multiplier 24 generates a voltage $V_{CS\_REF}(\theta)$, which has the form of a rectified sinusoid and has an amplitude that depends on the control voltage $V_c$ and on the r.m.s. voltage present on the power supply line.

The first comparator 26 compares the voltage $V_{CS\_REF}(\theta)$ with the voltage present on the sense resistor $R_s$, which is referred to hereinafter as voltage Vcs(t,$\theta$). The voltage Vcs(t,$\theta$) is directly proportional to the current flowing in the transistor M when the latter is turned on.

The control module 15 furthermore comprises a first and a second current generator 41, 43, that respectively generate a current $I_{R1}$ and a current $I_{R2}$, which are constant. Furthermore, the control module 15 also comprises a first and a second switch SW1, SW2, which are controlled, respectively, by the signal sQ and by the signal $\overline{sQ}$, as described in more detail in the following.

The control module 15 comprises another two capacitors, which are respectively referred to hereinafter as first and second regulation capacitor $C_r$, $C_{r2}$ and a further resistor $R_{r2}$, which is referred to hereinafter as regulation resistor $R_{r2}$.

In more detail, the control module 15 defines a first and a second regulation node $N_{R1}$, $N_{R2}$, which are respectively connected to the positive input terminal and to the negative input terminal of the second comparator 27.

In even more detail, the first and the second terminal of the first regulation capacitor $C_r$ are connected, respectively, to the first regulation node $N_{R1}$ and to ground. The first switch SW1 is connected between the first regulation node $N_{R1}$ and ground. Furthermore, the first current generator 41 is connected to the first regulation node $N_{R1}$, in such a manner as to inject the current $I_{R1}$ into the first regulation node $N_{R1}$.

The first and the second terminal of the second regulation capacitor $C_{r2}$ are respectively connected to the second regulation node $N_{R2}$ and to ground. Similarly, the first and the second terminal of the regulation resistor $R_{r2}$ are connected, respectively, to the second regulation node $N_{R2}$ and to ground. The second switch SW2 is connected between the second current generator 43 and the second regulation node $N_{R2}$.

In operation, when the signal sQ takes the logical value '1', the first switch SW1 is closed, therefore the first regulation capacitor $C_r$ is placed in parallel with a short-circuit. When the signal sQ takes the logical value '0', the first switch SW1 is opened and thus corresponds to an open circuit.

In addition, when the signal $\overline{sQ}$ takes the logical value '1', the second switch SW2 is closed, therefore the second current generator 43 is electrically connected to the second regulation node $N_{R2}$, into which the current $I_{R2}$ is injected. When the signal $\overline{sQ}$ takes the logical value '0', the second switch SW2 is opened, thus the second current generator 43 is electrically decoupled from the second regulation node $N_{R2}$.

Figure 2:
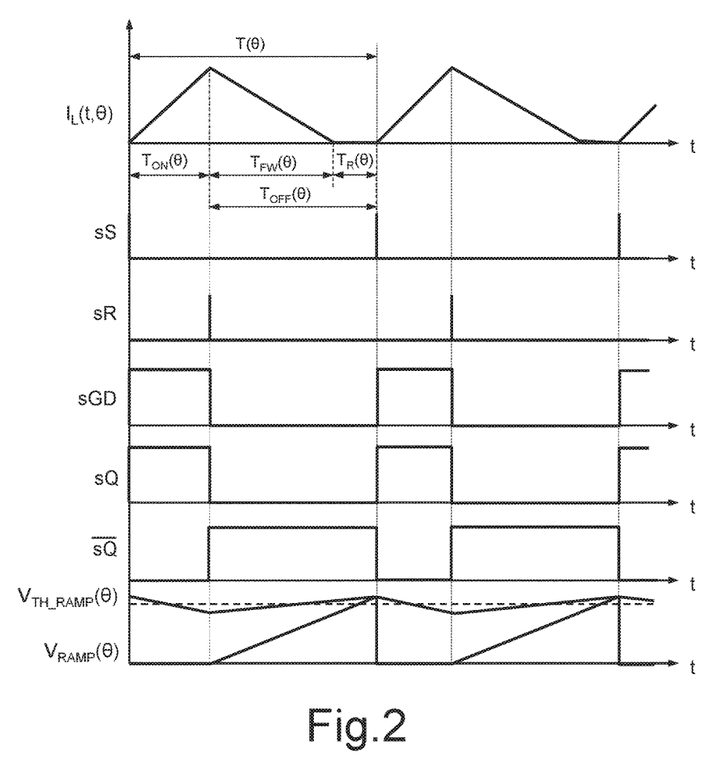
FIGS. 2 and 3 show behaviors over time of signals generated inside of the power supply shown in FIG. 1.

The aforementioned voltages $V_{RAMP}(\theta)$ and $V_{TH\_RAMP}(\theta)$ are formed by the voltages present, respectively, on the first and on the second regulation node $N_{R1}$, $N_{R2}$. The operation of the boost power supply 1 is now described with reference to FIG. 2, which shows the behaviors over time of the following signals:

the current flowing in the inductor 4, indicated with $I_L(t,\theta)$;
a signal sS (of the logical type) present on the set input of the flip-flop 28;
a signal sR (of the logical type) present on the reset input of the flip-flop 28;
a signal sGD (of the logical type), which is generated by the driver circuit 30 on its output and regulates the time variation of the current $I_L(t,\theta)$ flowing in the inductor 4, from the moment that it turns on and turns off the transistor M;
the aforementioned signal sQ, present on the output Q of the flip-flop 28, which from a logical point of view is equivalent to the signal sGD (it is assumed that the driver circuit 30 does not introduce any delay);
the aforementioned signal $\overline{sQ}$, present on the output $\overline{Q}$ of the flip-flop 28; and
the aforementioned voltages $V_{TH\_RAMP}(\theta)$ and $V_{RAMP}(\theta)$.

Again with reference to FIG. 2, it is noted that, in indicating the quantities shown herein, the fact that no dependence on parameters is made explicit (to be specific, the phase $\theta$ and/or the time t) does not imply that the quantity in question is necessarily constant.

In detail, assuming for example that the signal sQ and the signal sGD take the logical value '1', the transistor M goes into conduction, therefore the current $I_L(t,\theta)$ flowing in the inductor 4 and the current flowing in the sense resistor $R_s$ are linearly increasing, while the output diode D is blocked; in other words, the inductor 4 is charged, i.e., it stores energy in the form of a corresponding magnetic field.

The transistor M remains in conduction, and therefore the current $I_L(t,\theta)$ and the current flowing in the sense resistor $R_s$ continue to increase, as long as the reset input of the flip-flop 28 remains equal to the logical value '0', and in other words when the current flowing in the sense resistor $R_s$ has not reached a value such that the voltage $Vcs(t,\theta)$ on the sense resistor $R_s$ equals the voltage $V_{CS\_REF}(\theta)$; indeed, as a result of the latter event, the reset input of the flip-flop 28 takes the logical value '1'. In FIG. 2, the period in which the transistor M is conducting is indicated with $T_{ON}(\theta)$.

During the period $T_{ON}(\theta)$, the voltage $V_{RAMP}(\theta)$ is zero, as soon as the signal sQ is equal to the logical value '1', thus the first switch SW1 is closed and connects the first regulation node $N_{R1}$ to ground.

After the voltage $Vcs(t,\theta)$ on the sense resistor $R_s$ has become equal to the voltage $V_{CS\_REF}(\theta)$, the signal sR, present on the reset input of the flip-flop 28, takes the logical value '1'. Consequently, the signal sQ takes the logical value '0', as does the signal sGD; the transistor M is thus turned off.

Subsequent to the turning off of the transistor M, the current flowing in the sense resistor $R_s$ falls to zero, whereas the whole of the current $I_L(t,\theta)$ flows through the output diode D and decreases linearly.

In more detail, as soon as the current flowing in the sense resistor $R_s$ becomes zero, the voltage $Vcs(t,\theta)$ on the sense resistor $R_s$ also becomes zero, therefore goes back to being lower than the voltage $V_{CS\_REF}(\theta)$. Consequently, the signal sR re-acquires the logical value '0'.

In other words, the signal sR defines a short pulse, when the voltage $Vcs(t,\theta)$ on the sense resistor $R_s$ becomes equal to the voltage $V_{CS\_REF}(\theta)$, this pulse having a negligible duration over time. Furthermore, the output of the flip-flop 28 switches to '0' on the rising edge of the signal sR.

Again with reference to the current $I_L(t,\theta)$, this decreases linearly until it becomes zero. In FIG. 2, the period intervening between the time when the transistor M turns off and when the current $I_L(t,\theta)$ in the inductor 4 becomes zero is indicated with $T_{FW}(\theta)$.

In addition, when the voltage $Vcs(t,\theta)$ on the sense resistor $R_s$ becomes equal to the voltage $V_{CS\_REF}(\theta)$, the first switch SW1 is opened, from the moment when, as previously explained, the signal sQ takes the logical value '0'. The first regulation capacitor $C_r$ thus starts to be charged up by the current $I_{R1}$, which is constant; as a result, the voltage $V_{RAMP}(\theta)$ starts to rise linearly.

In particular, the voltage $V_{RAMP}(\theta)$ increases linearly until the point at which it becomes equal to the voltage $V_{TH\_RAMP}(\theta)$, this time being subsequent to the current $I_L(t,\theta)$ in the inductor 4 falling to zero, in the example shown in FIG. 2.

In detail, when the voltage $V_{RAMP}(\theta)$ becomes equal to the voltage $V_{TH\_RAMP}(\theta)$, the signal sS, present on the set input of the flip-flop 28, takes the logical value '1'. Consequently, the signal sQ takes the logical value '1', as does the signal sGD; the transistor M is thus turned on. In other words, the output of the flip-flop 28 switches to '1' on the rising edge of the signal sS.

In more detail, as soon as the signal sQ has re-acquired the logical value '1', the first switch SW1 closes; consequently, straight after reaching the voltage $V_{TH\_RAMP}(\theta)$, the voltage $V_{RAMP}(\theta)$ drops to zero. In other words, when the voltage $V_{RAMP}(\theta)$ becomes equal to the voltage $V_{TH\_RAMP}(\theta)$, the signal sS defines a corresponding pulse, this pulse having a negligible duration over time.

In FIG. 2, the period intervening between the time when the current $I_L(t,\theta)$ becomes zero and when the transistor M subsequently turns on is indicated with $T_R(\theta)$.

The sum of the periods $T_{FW}(\theta)$ and $T_R(\theta)$ is indicated as $T_{OFF}(\theta)$ and corresponds to the time that the transistor M remains off. Furthermore, indicating the switching period with $T(\theta)$, then $T(\theta)=T_{ON}(\theta)+T_{FW}(\theta)+T_R(\theta)$; the relationship $T(\theta) \ll 1/f_{line}$ furthermore holds, in which $f_{line}$ indicates the frequency of the power supply line.

With regard to the voltage $V_{TH\_RAMP}(\theta)$, during the period $T_{ON}(\theta)$ this decreases linearly, from the moment that the signal $\overline{sQ}$ is equal to the logical value '0', thus the second switch SW2 is opened and, accordingly, the charge previously stored in the second regulation capacitor $C_{t2}$ is gradually discharged to ground through the regulation resistor $R_{t2}$. In this regard, it is assumed that the relationship $T(\theta) \ll R_{t2}*C_{t2} \ll 1/*f_{line}$ holds, where $R_{t2}$ and $C_{t2}$ respectively indicate the values of resistance and of capacitance of the circuit elements having the same reference symbols. For example, $T(\theta)<0.1*R_{t2}*C_{t2}$ is assumed to hold; therefore these elements may, for example, have the values $R_{t2}*C_{t2}=100$ μs and $T(\theta)=10$ μs.

In more detail, the voltage $V_{TH\_RAMP}(\theta)$ decreases linearly until the time when the signal $\overline{sQ}$ takes the logical value '0', i.e., for as long as the voltage $Vcs(t,\theta)$ on the sense resistor $R_s$ is not equal to the voltage $V_{CS\_REF}(\theta)$. After the voltage $Vcs(t,\theta)$ on the sense resistor $R_s$ has become equal to the voltage $V_{CS\_REF}(\theta)$, the voltage $V_{TH\_RAMP}(\theta)$ rises linearly, from the moment that the second switch SW2 is closed and this means that part of the current $I_{R2}$ goes to charging up the second regulation capacitor $C_{t2}$.

In particular, the voltage $V_{TH\_RAMP}(\theta)$ increases linearly until the time when, as previously explained, the value of the voltage $V_{RAMP}(\theta)$ becomes equal to the value of this same voltage $V_{TH\_RAMP}(\theta)$; indeed, subsequent to this event, the signal $\overline{sQ}$ re-acquires the logical value '0', and thus the second switch SW2 opens.

As far as the output voltage $V_{out}$ is concerned, this is constant, under the assumption of neglecting a first "ripple", at the power line frequency $2*f_{line}$, and a second "ripple" at the switching frequency, the latter "ripple" being caused by a non-zero series resistance associated with the output capacitor $C_{out}$. In practice, over periods of time of the order of a few switching cycles, the second ripple is bigger than the first ripple.

This having been said, during the period $T_{ON}(\theta)$, the output capacitor $C_{out}$ is discharged through the load (assuming that the resistances of the third and of the fourth resistor $R_c$, $R_d$ are high, and thus for example of the order of a MΩ), from the moment that the output diode D does not conduct. Furthermore, during the period $T_{FW}(\theta)$, the output capacitor $C_{out}$ charges up, given that part of the current originating from the inductor 4 now flows into the output capacitor $C_{out}$, another part of the current coming from the inductor 4 flowing, on the other hand, into the load. Finally, during the period $T_R(\theta)$, the output capacitor $C_{out}$ is again discharged through the load.

Figure 3:
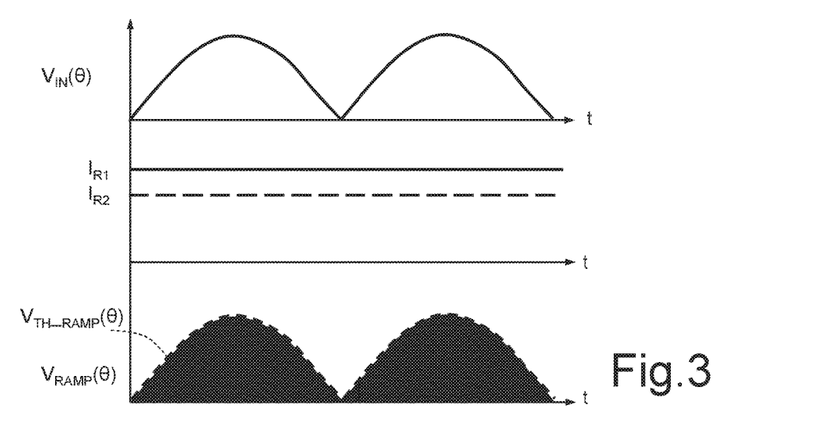

Examples of behaviors over time of the voltages $V_{IN}(\theta)$, $V_{RAMP}(\theta)$, $V_{TH\_RAMP}(\theta)$ and of the currents $I_{R1}$ and $I_{R2}$ are shown in FIG. 3. In this respect, the fact that the currents $I_{R1}$ and $I_{R2}$ are shown as different is purely exemplary.

In practice, the multiplier 24, the first comparator 26 and the flip-flop 28 form a circuit that controls the driver circuit 30 in such a manner as to cause the generation of the falling edges of the signals sQ and sGD. Furthermore, the first and the second current generator 41, 43, the first and the second regulation capacitor $C_r$, $C_{t2}$, the first and the second switch SW1, SW2, the regulation resistor $R_{t2}$, the second comparator 27 and the flip-flop 28 form a circuit that controls the driver circuit 30 in such a manner as to cause the generation of the rising edges of the signals sQ and sGD; in the latter circuit, the first and the second capacitor $C_r$, $C_{r2}$ are charged and discharged in a manner that is synchronous with the signal sQ, i.e., with timings that depend on the signal sQ.

In addition to the preceding operational details, it may be noted how the boost converter 3 is characterized by a constant switching frequency.

Indeed, recalling the aforementioned relationship $T(\theta) \ll R_{r2} * C_{r2}$ and applying the charge analysis on the second regulation capacitor $C_{r2}$, the following is obtained:

$$I_{R2} T_{OFF}(\theta) = \frac{V_{TH\_RAMP}(\theta)}{R_{r2}} T(\theta) \quad (1)$$

from which the following is derived:

$$V_{TH\_RAMP}(\theta) = I_{R2} R_{r2} \frac{T_{OFF}(\theta)}{T(\theta)} \quad (2)$$

Assuming that the charge current $I_{R1}$ of the first regulation capacitor $C_r$ is constant, this leads to:

$$V_{RAMP}(\theta) = \frac{I_{R1}}{C_r} T_{OFF}(\theta) \quad (3)$$

In practice, the voltage $V_{RAMP}(\theta)$ is directly proportional to the duration of the period $T_{OFF}(\theta)$, whereas the voltage $V_{TH\_RAMP}(\theta)$ is directly proportional to the ratio between the period $T_{OFF}(\theta)$ and the switching period $T(\theta)$. Furthermore, from the moment that the transistor M is turned on, when the condition $V_{TH\_RAMP}(\theta) = V_{RAMP}(\theta)$ is verified, the following relationship holds:

$$T_{OFF}(\theta) \frac{I_{R1}}{C_r} = I_{R2} R_{r2} \frac{T_{OFF}(\theta)}{T(\theta)} \quad (4)$$

Consequently, this gives the relationship:

$$\frac{1}{T(\theta)} = \frac{I_{R1}}{I_{R2}} \frac{1}{R_{r2} C_r} = F_{SW} \quad (5)$$

in which $F_{SW}$ indicates the switching frequency.

The relationship (5) highlights how the switching frequency is constant and only depends on the internal parameters of the boost converter 3. The switching frequency is thus independent, to a first approximation, of the operating conditions imposed for the boost converter 3, i.e., of the values of the input voltage $V_{IN}$ and of the output voltage $V_{OUT}$, and also of the operating mode (for example, CCM or DCM).

More generally, the switching frequency is independent of the technique implemented by the control module 15 for controlling the duration of the period $T_{ON}(\theta)$, and also of the topology. In other words, possible embodiments are of the type shown schematically in FIG. 4.

Figure 4:
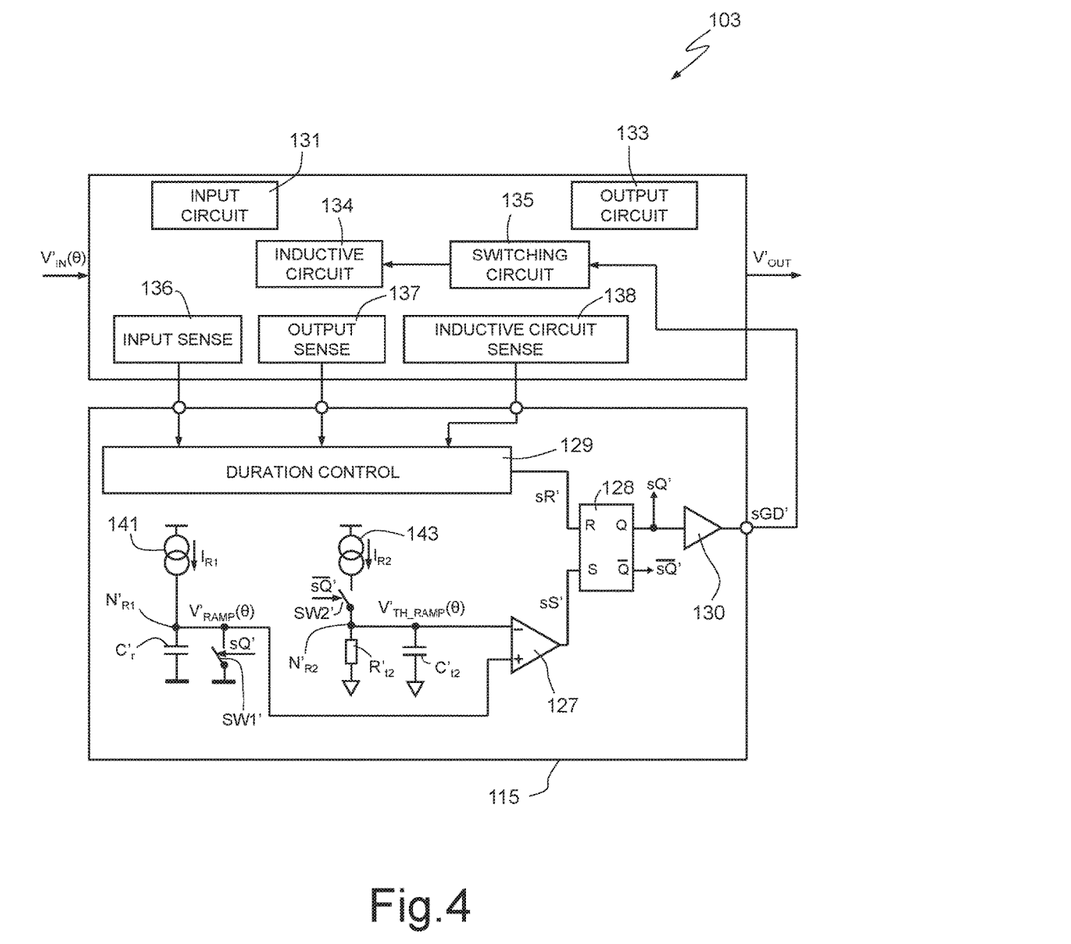
FIGS. 4 and 5 show circuit diagrams of switching converters.

In particular, FIG. 4 shows a control module 115 for a switching converter 103, which may just as easily be of the AC/DC or DC/DC type, therefore it does not necessarily form a power factor corrector (or PFC).

This having been said, the control module 115 is described with reference only to the differences with respect to the control module 15 shown in FIG. 1. Components of the control module 115 already present in the control module 15 are indicated with the same numbers, increased by one hundred, except in the case of components indicated with symbols that are not purely numerical, in which case an apostrophe is added.

The control module 115 comprises a control circuit (indicated with 129), which generates the signal sR' and thus controls the generation of the falling edges of the signals sQ' and sGD'. The control circuit 129 thus controls the duration of the conduction period $T_{ON}(\theta)$.

Furthermore, the switching converter 103 comprises an input circuit 131, an output circuit 133, an inductive circuit 134, a switching circuit 135 and at least one from amongst a first, a second and a third sense circuit 136, 137, 138.

The switching circuit 135 is coupled to the inductive circuit 134 and receives the signal sGD', in such a manner as to control the current flowing in at least one inductor of the inductive circuit 134. On the other hand, as regards other connections present between the input circuit 131, the output circuit 133, the inductive circuit 134, the switching circuit 135 and the first, the second and the third sense circuit 136, 137, 138, these are not shown in FIG. 4 as they are of the type known per se and depend on the topology implemented by the switching converter 103 (for example, buck, boost or flyback), and also on the control mode (for example, using peak-current or, alternatively, voltage control). Generally speaking, the implementation details of the input circuit 131, of the output circuit 133, of the inductive circuit 134, of the switching circuit 135 and of the first, of the second and of the third sense circuits 136, 137, 138, and also of the related connections, are irrelevant to the purposes of the operation of the control module 115.

In more detail, the first, the second and the third sense circuits 136, 137, 138 generate corresponding quantities indicative, respectively, of the input voltage (here indicated with $V_{in}(\theta)$), of the output voltage ($V'_{OUT}$) and of the current flowing in at least one inductor of the inductive circuit 134; depending on the topology and on the control implemented, the control circuit 129 generates the signal sR' as a function of one or more of these corresponding quantities, and also as a function of a reference voltage, in a manner known per se.

In practice, the control circuit 129 controls the duration of the period in which the switching circuit 135 is turned on and thus controls the transfer of energy to the load. Furthermore, independently of the implementation details relating to the generation of the signal sR', and thus relating to how the limits of the period $T_{ON}(\theta)$ are imposed (or equivalently, relating to how $T_{ON}(\theta)$ is modulated), the converter module 115 modulates, on the basis of the signal sQ', the duration of the period $T_{OFF}(\theta)$, in such a manner as to maintain the switching frequency constant. The first and the second current generator 141, 143, the first and the second switch SW1', SW2', the first and the second regulation capacitor $C'_r$, $C'_{r2}$, the regulation resistor $R'_{r2}$, the second comparator 127 and the flip-flop 128 thus form a stage that dictates the limits of the period $T_{OFF}(\theta)$, and thus modulates the duration of the period $T_{OFF}(\theta)$, as a function of the period $T_{ON}(\theta)$.

Figure 5:
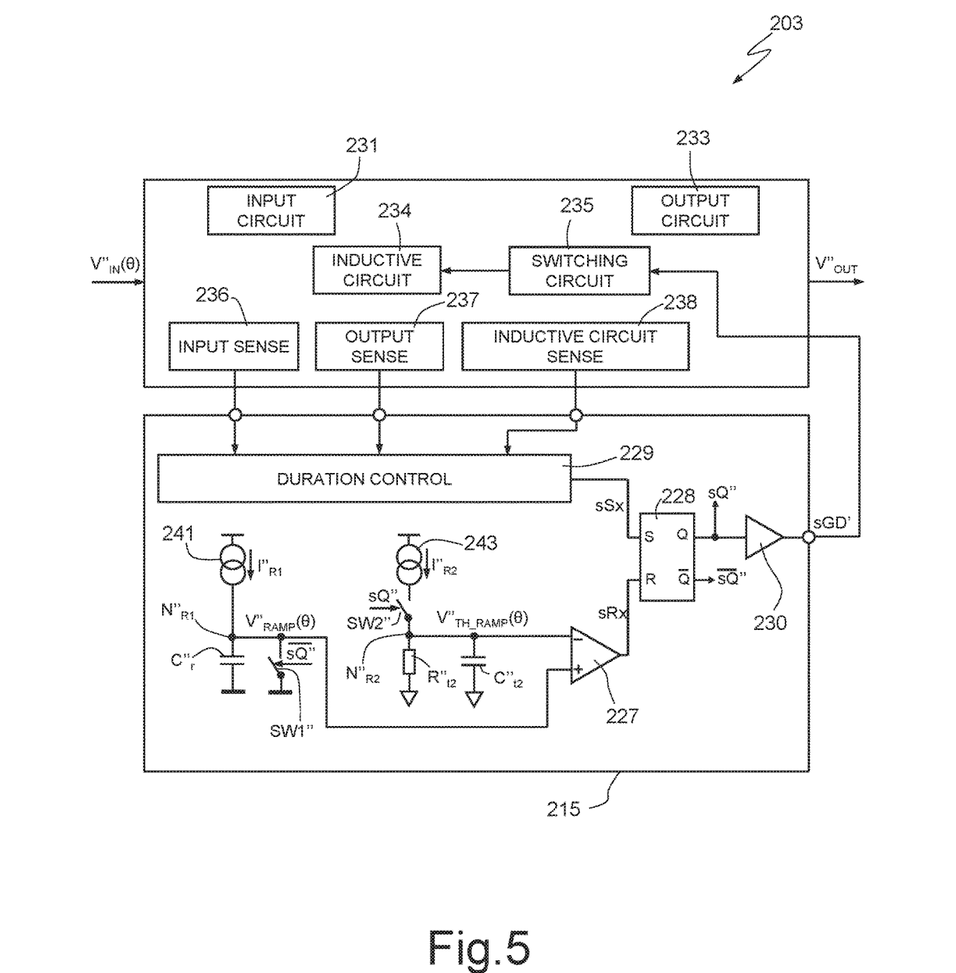

Even more generally, possible embodiments are of the type shown in FIG. 5.

In detail, FIG. 5 shows a further control module 215, which forms a further switching power supply 203. The control module 215 and the switching power supply 203 are described with reference only to the differences with respect to the control module 115 and to the switching power supply 103, respectively, shown in FIG. 4. Components of the control module 215 and of the switching power supply 203 already present in the control module 115 and in the switching power supply 103 are indicated with the same numbers, increased by one hundred, except in the case of components indicated with symbols that are not purely numerical, in which case a double apostrophe is employed in place of a single apostrophe, and also except where specified differently.

In more detail, there are now present, respectively, on the reset and set inputs of the flip-flop 228 a signal sRx and a signal sSx, which are respectively generated by the second comparator 227 and by the control circuit (indicated with 229). Furthermore, the first and the second switch SW1" and SW2" are controlled, respectively, by the signal $\overline{sQ''}$ and by the signal sQ".

In practice, the control circuit 229 causes the generation of the rising edges of the signals sQ" and sGD". The control circuit 229 thus controls the duration of the off time $T_{OFF}(\theta)$, whereas the first and the second current generator 241, 243, the first and the second switch SW1", SW2", the first and the second regulation capacitor $C''_R$, $C''_{t2}$, the regulation resistor $R''_{t2}$, the second comparator 227 and the flip-flop 228 form a stage that modulates the duration of the period $T_{ON}(\theta)$ as a function of the period $T_{OFF}(\theta)$.

From an analytical point of view, the relationships (1)-(5) continue to be valid, provided that the period $T_{ON}(\theta)$ is substituted for the period $T_{OFF}(\theta)$.

Once again with reference, by way of example, to the boost converter 3 shown in FIG. 3, it is possible to demonstrate that, in the case where the condition $T(\theta) \ll R_e * C_{t2}$ is not fully satisfied, the real switching frequency is equal to:

$$F_{SW\_real}(\theta) = \left(\frac{I_{R1}}{I_{R2}} \frac{1}{R_{t2}C_R}\right) \frac{1}{1 + \frac{T_{ON}(\theta)}{2R_{t2}C_{t2}}} = F_{SW} \frac{1}{1 + \frac{T_{ON}(\theta)}{2R_{t2}C_{t2}}} \quad (6)$$

where the following relationship holds:

$$\frac{1}{1 + \frac{T_{ON}(\theta)}{2R_{t2}C_{t2}}} \cong 1 \quad (7)$$

In more detail, it may be demonstrated that the real switching frequency deviates from the ideal switching frequency (given by the relationship (5)) by not more than 5% from the latter, in particular under full-load conditions and in proximity to the zero-crossing points of the input voltage.

Figure 6:
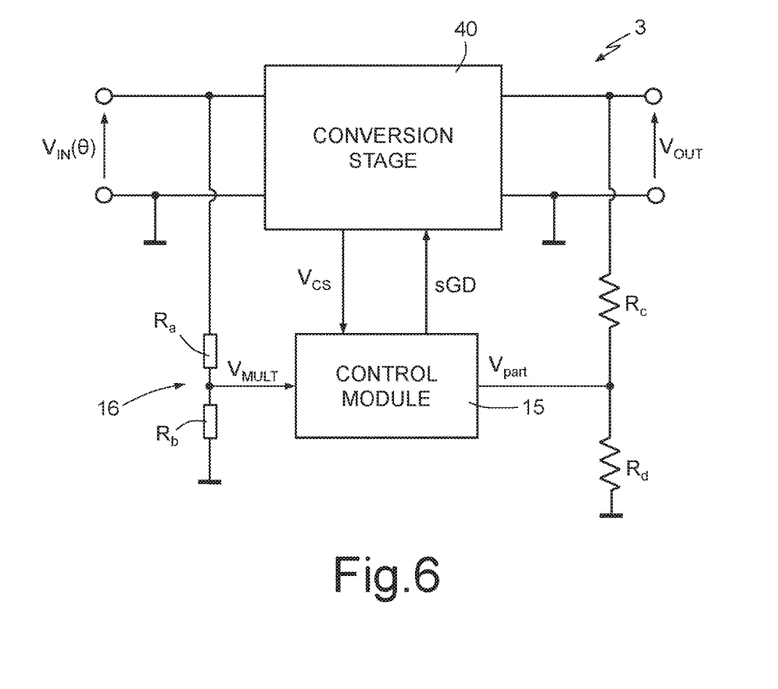
FIG. 6 shows a block diagram relating to the switching converter shown in FIG. 1.

For practical purposes, each of the switching converters described implements an electrical circuit diagram of the type shown in FIG. 6, which, with no loss of generality, refers to the boost converter 3.

In detail, the boost converter 3 is formed by a conversion stage 40, which is operationally coupled to the control module 15. In particular, the conversion stage 40 receives on its input the input voltage $V_{IN}(\theta)$ and is controlled by the control module 15 in such a manner as to supply the output voltage $V_{OUT}$. As shown in FIG. 6, the control of the conversion stage 40 takes place by virtue of the aforementioned signal sGD and of the voltage Vcs(t,θ) present on the sense resistor $R_s$; furthermore, although not shown in FIG. 6, the conversion stage 40 is also controlled on the basis of the feedback loop present between the output of the conversion stage 40 and the control module 15. In addition, in order to control the conversion stage 40, the control module 15 receives on its input, via the first resistive voltage divider 16, a fraction of the input voltage $V_{IN}(\theta)$, indicated with $V_{MULT}$ in FIG. 6.

Each of the switching converters described may furthermore be employed for supplying, for example, one or more solid-state lighting devices.

Figure 7:
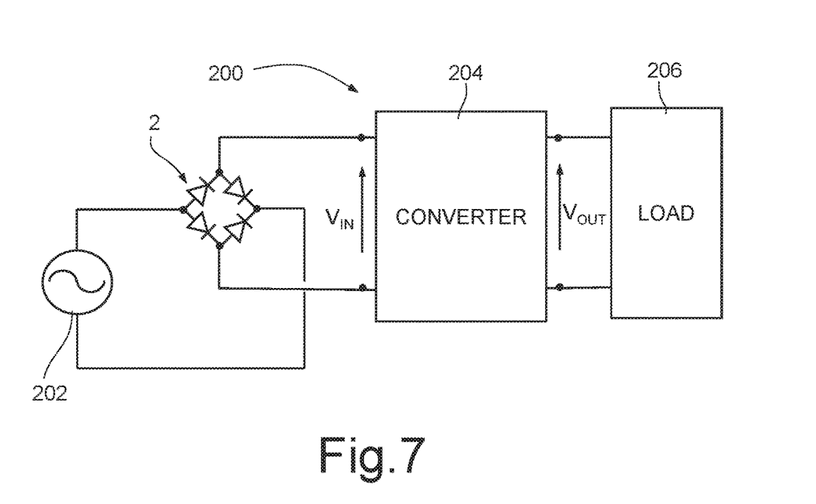
FIG. 7 shows a block diagram of a system for supplying power to a load.

For example, FIG. 7 shows a lighting system 200, which, without any loss of generality, is connected to a generator of an alternating voltage 202. The lighting system 200 comprises the bridge rectifier 2 and a switching converter 204 according to any one of the embodiments previously described. Furthermore, the lighting system 200 comprises a load 206 formed, for example, by a LED or by an array of LEDs.

From what has been described and illustrated previously, the advantages that the present solution offers will be clearly apparent.

In particular, the present control module allows a substantially constant switching frequency to be obtained, independently of the load, of the operating conditions, of the topology, of the mode of operation, and also independently of the technique for controlling the turn-on time of the transistor, and on the basis only of the signal sQ. In this way, amongst other things, the operating frequency is prevented from being able to adopt excessively high values.

In addition, the present solution does not require any slope-compensation technique to be implemented.

In conclusion, it is clear that modifications and variants may be applied to what has been described and illustrated thus far, without however straying from the scope of protection of the present disclosure.

For example, the first and the second current generator 41, 43 may be formed by one and the same current generator.

Furthermore, as previously explained, the present control module includes a kind of module for controlling the period $T_{OFF}$ (or else $T_{ON}$) which is independent of the mode used to modulate $T_{ON}$ (or else $T_{OFF}$), so that, referring for example to the embodiments that implement a control of the peak-current type, the signal Vcs(t,θ) may be generated in a different way from that described. For example, the sense circuit 135 may be disposed in series with the inductor 4, or else may be disposed on the 'ground return'.

The present control module may furthermore form a switching converter which comprises different or additional components with respect to those described. For example, the switching converter may also comprise a 'clamping circuit', which is disposed in such a manner as to limit the voltage spikes present on the drain terminal of the transistor M.

In addition, embodiments of the present control module may also be employed outside of the scope of PFCs. For example, as previously mentioned, embodiments of the present control module may be employed to form DC/DC converters. Again, by way of example, it is possible to use the embodiment shown in FIG. 5, in which the period $T_{ON}(\theta)$ is modulated, to form a voltage regulation module, for example, in order to supply a processor.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control module for a switching converter configured to generate an output electrical quantity from an input electrical quantity and including an inductor element and one switching element, which is operable in such a manner as to vary a current flowing in the inductor element, said control module comprising:
   a driver circuit configured to generate a first control signal designed to control on and off cycles of the switching element;
   a first modulation circuit configured to cause the driver circuit to generate first edges of the first control signal as a function of the input electrical quantity and of a reference electrical quantity, the first edges being of a first type; and
   a second modulation circuit configured to cause the driver circuit to generate second edges of the first control signal, the second edges being of a second type, the second modulation circuit including:
      a first sub-circuit including a first capacitor and a first charge circuit configured to control, during each on and off cycle, charging and discharging of the first capacitor as a function of the first control signal, and generate a first internal electrical quantity, which is a function of a charge on the first capacitor;
      a second sub-circuit including a second capacitor and a second charge circuit configured to control, during each on and off cycle, charging and discharging of the second capacitor as a function of the first control signal, to generate a second internal electrical quantity, which is a function of a charge on the second capacitor; and
      a decision circuit configured to control the driver circuit in such a manner as to cause generation of the second edges of the first control signal when the first and second internal electrical quantities satisfy a relationship, wherein:
      the first charge circuit is configured to generate, within each on and off cycle, the first internal electrical quantity to be directly proportional to a duration of a time interval included between the corresponding first edge of the first control signal and the second edge of the first control signal in the on and off cycle; and
      the second charge circuit is configured to generate the second internal electrical quantity as a function of a ratio between said time interval and a switching period.

2. The control module according to claim 1, wherein:
   the first charge circuit is configured to completely discharge the first capacitor, during each on and off cycle;
   the second charge circuit is configured to partially discharge the second capacitor, during each on and off cycle; and
   the first and the second charge circuit are furthermore configured to charge the first capacitor up faster than the second capacitor and discharge the first capacitor faster than the second capacitor; and
   said relationship between the first and the second internal electrical quantities is a relationship of equality.

3. The control module according to claim 2, in which the first and second charge circuits are furthermore configured to charge the first and second capacitors simultaneously, during said time interval.

4. The control module according to claim 1, in which the first charge circuit comprises:
   a first switch, said first switch and the first capacitor being coupled in parallel between a first intermediate node and a node configured to be placed at a reference potential; and
   a first current generator electrically coupled to the first intermediate node; and in which the second charge circuit comprises:
   a resistor coupled in parallel with the second capacitor, between a second intermediate node and the node configured to be placed at the reference potential;
   a second current generator; and
   a second switch interposed between the second current generator and the second intermediate node;
   and in which the first and the second internal electrical quantities are functions of voltages present, respectively, on the first and second intermediate nodes.

5. The control module according to claim 1, in which the first modulation circuit comprises:
   a reference circuit configured for generating a second control signal as a function of the reference electrical quantity;
   a multiplier configured for generating a reference signal which depends on the second control signal and on the input electrical quantity; and
   a comparator circuit configured for generating a comparison signal indicative of a comparison between a sense signal, which is indicative of the current in the inductor element, and the reference signal;
   and in which the first modulation circuit is furthermore configured to control the driver circuit in such a manner as to generate the first edges of the first control signal as a function of the comparison signal.

6. The control module according to claim 5, in which the reference circuit is configured to generate the second control signal as a function of the reference electrical quantity and of a feedback electrical quantity, which depends on the output electrical quantity.

7. The control module according to claim 6, in which the reference circuit comprises an error amplifier circuit which receives the reference electrical quantity and the feedback electrical quantity.

8. The control module according to claim 6, wherein the first modulation circuit is configured to cause the driver circuit to generate the first edges of the first control signal in a way that modulates an ON-time of the switching element and second first modulation circuit is configured to cause the driver circuit to generate the second edges of the first control signal in a way that modulates an OFF-time of the switching element and keeps constant a switching frequency of the switching element.

9. The control module according to claim 6, wherein the first modulation circuit is configured to cause the driver circuit to generate the first edges of the first control signal in a way that modulates an OFF-time of the switching element and second first modulation circuit is configured to cause the driver circuit to generate the second edges of the first control signal in a way that modulates an ON-time of the switching element and keeps constant a switching frequency of the switching element.

10. A switching converter configured to generate an output electrical quantity from an input electrical quantity, switching converter comprising:
   an inductor element;
   a switching element operable in such a manner as to vary a current flowing in the inductor element;

a control module that includes:
a driver circuit configured to generate a first control signal designed to control on and off cycles of the switching element;
a first modulation circuit configured to cause the driver circuit to generate first edges of the first control signal as a function of the input electrical quantity and of a reference electrical quantity, the first edges being of a first type; and
a second modulation circuit configured to cause the driver circuit to generate second edges of a second type of the control signal, the second edges being of a second type, the second modulation circuit including:
a first sub-circuit including a first capacitor and a first charge circuit configured to control, during each on and off cycle, charging and discharging of the first capacitor as a function of the first control signal, and generate a first internal electrical quantity, which is a function of a charge on the first capacitor;
a second sub-circuit including a second capacitor and a second charge circuit configured to control, during each on and off cycle, charging and discharging of the second capacitor as a function of the first control signal, generate a second internal electrical quantity, which is a function of a charge on the second capacitor; and
a decision circuit configured to control the driver circuit in such a manner as to cause generation of the second edges of the control signal when the first and second internal electrical quantities satisfy a relationship, wherein:
the first charge circuit is configured to generate, within each on and off cycle, the first internal electrical quantity to be directly proportional to a duration of a time interval included between the corresponding first edge of the first control signal and the second edge of the first control signal in the on and off cycle; and
the second charge circuit is configured to generate the second internal electrical quantity as a function of a ratio between said time interval and a switching period.

11. The switching converter according to claim 10, wherein:
the first charge circuit is configured to completely discharge the first capacitor, during each on and off cycle;
the second charge circuit is configured to partially discharge the second capacitor, during each on and off cycle; and
the first and the second charge circuit are furthermore configured to charge the first capacitor up faster than the second capacitor and discharge the first capacitor faster than the second capacitor; and
said relationship between the first and the second internal electrical quantities is a relationship of equality.

12. The switching converter according to claim 11, in which the first and second charge circuits are furthermore configured to charge the first and second capacitors simultaneously, during said time interval.

13. The control module according to claim 10, in which the first charge circuit comprises:
a first switch, said first switch and the first capacitor being coupled in parallel between a first intermediate node and a node configured to be placed at a reference potential; and a first current generator electrically coupled to the first intermediate node; and in which the second charge circuit comprises:
a resistor coupled in parallel with the second capacitor, between a second intermediate node and the node configured to be placed at the reference potential;
a second current generator; and
a second switch interposed between the second current generator and the second intermediate node;
and in which the first and the second internal electrical quantities are functions of voltages present, respectively, on the first and second intermediate nodes.

14. The switching converter according to claim 10, in which the first modulation circuit comprises:
a reference circuit configured for generating a second control signal as a function of the reference electrical quantity;
a multiplier configured for generating a reference signal which depends on the second control signal and on the input electrical quantity; and
a comparator circuit configured for generating a comparison signal indicative of a comparison between a sense signal, which is indicative of the current in the inductor element, and the reference signal;
and in which the first modulation circuit is furthermore configured to control the driver circuit in such a manner as to generate the first edges of the control signal as a function of the comparison signal.

15. The switching converter according to claim 14, wherein:
the first and second edges of the control signal are respectively falling edges and rising edges;
the switching element is configured to turn off and to turn on, respectively, in response to the first and second edges of the control signal; and
the first internal electrical quantity is directly proportional to the off time of the switching element, the second internal electrical quantity being a function of the ratio between the off time and the switching period.

16. The switching converter according to claim 14, in which the reference circuit is configured to generate the second control signal as a function of the reference electrical quantity and of a feedback electrical quantity, which depends on the output electrical quantity.

17. The switching converter according to claim 16, in which the reference circuit comprises an error amplifier circuit which receives the reference electrical quantity and the feedback electrical quantity.

18. A method, comprising:
controlling a switching converter that generates an output electrical quantity from an input electrical quantity and includes at least one inductor element and a switching element, which is operable in such a manner as to vary a current flowing in said inductor element, said controlling including:
generating a first control signal which controls on and off cycles of the switching element, wherein generating the first control signal includes generating first edges of the control signal as a function of the input electrical quantity and of a reference electrical quantity and generating second edges of the control signal as a function of the control signal, the first edges being of a first type and the second edges being of a second type;
wherein generating the second edges of the control signal comprises:
during each on and off cycle, controlling charging and discharging a first capacitor as a function of the first control signal, generating a first internal electrical quantity, which is a function of a charge on the first capacitor;

during each on and off cycle, controlling charging and discharging of a second capacitor as a function of the first control signal, generating a second internal electrical quantity, which is a function of a charge on the second capacitor; and generating the second edges of the first control signal when the first and the second internal electrical quantities satisfy a relationship;

wherein controlling the charging and the discharging of the first capacitor is carried out in such a manner that, within each on and off cycle, the first internal electrical quantity is directly proportional to a duration of a time interval included between the corresponding first edge of the first control signal and the successive second edge of the first control signal; and wherein controlling the charging and the discharging of the second capacitor is carried out in such a manner that the second internal electrical quantity is a function of the ratio between said time interval and the switching period.

19. The method according to claim 18, wherein:

controlling the charging and the discharging of the first capacitor completely discharges the first capacitor, during each on and off cycle;

controlling the charging and the discharging of the second capacitor partially discharges the second capacitor, during each on and off cycle;

controlling the charging and the discharging of the first and second capacitors comprise charging the first capacitor faster than the second capacitor and discharging the first capacitor faster than the second capacitor; and said relationship between the first and the second internal electrical quantities is a relationship of equality.

20. The method according to claim 18, wherein generating the first edges of the first control signal comprises:

generating a second control signal as a function of the reference electrical quantity;

generating a reference signal which depends on the second control signal and on the input electrical quantity; and generating a comparison signal indicative of a comparison between a sense signal, which is indicative of a current in the inductor element, and the reference signal; and generating the first edges of the first control signal as a function of the comparison signal.

21. The method according to claim 20, wherein generating the control signal comprises generating the second control signal as a function of the reference electrical quantity and of a feedback electrical quantity, which depends on the output electrical quantity.

* * * * *